(12) United States Patent
Sohn

(10) Patent No.: US 12,502,111 B2
(45) Date of Patent: Dec. 23, 2025

(54) HEALTHCARE APPARATUS FOR CALCULATING STRESS INDEX

(71) Applicant: Emma Healthcare Co., Ltd, Seongnam-si (KR)

(72) Inventor: Ryanghee Sohn, Yongin-si (KR)

(73) Assignee: EMMA HEALTHCARE CO., LTD, Seongnam-si (KR)

( * ) Notice: Subject to any disclaimer, the term of this patent is extended or adjusted under 35 U.S.C. 154(b) by 663 days.

(21) Appl. No.: 17/886,570

(22) Filed: Aug. 12, 2022

(65) Prior Publication Data

US 2023/0210423 A1     Jul. 6, 2023

(30) Foreign Application Priority Data

Dec. 30, 2021 (KR) .................... 10-2021-0192189
Apr. 15, 2022 (KR) .................... 10-2022-0046602

(51) Int. Cl.
*A61B 5/16* (2006.01)
*A61B 5/00* (2006.01)
(Continued)

(52) U.S. Cl.
CPC .......... *A61B 5/165* (2013.01); *A61B 5/02416* (2013.01); *A61B 5/1102* (2013.01);
(Continued)

(58) Field of Classification Search
CPC ... A61B 5/165; A61B 5/02416; A61B 5/4809; A61B 5/4818; A61B 5/1102; A61B 5/6892; G06T 7/11
See application file for complete search history.

(56) References Cited

U.S. PATENT DOCUMENTS 11,446,466 B1 *   9/2022   Shvartzman ......... A61B 5/4809
2012/0290215 A1 * 11/2012  Adler .................... G16H 50/30
                                                             702/19
(Continued)

FOREIGN PATENT DOCUMENTS

EP        3838128 A1    6/2021
JP       H04174304 A    6/1992
(Continued)

OTHER PUBLICATIONS

Gaetano Scebba et al., "Improving ROI detection in photoplethysmographic imaging with thermal cameras", Jul. 11, 2017, pp. 4285-4288, XP033152972.
(Continued)

*Primary Examiner* — Amanda L Steinberg
(74) *Attorney, Agent, or Firm* — Rabin & Berdo, P.C.

(57) ABSTRACT

A healthcare apparatus includes a BCG sensor; a camera; and a processor configured: to detect a ROI) corresponding to the face from the color facial image; to convert the detected first color image into a black and white image to acquire a first black and white image; to convert the detected second color image into a black and white image to acquire a second black and white image; to apply the acquired first black and white image and the acquired second black and white image to a predetermined trained algorithm model to output a remote photoplethysmography (rPPG) signal waveform of the subject; to calculate a first stress index based on the first heart rate variability; to calculate a second stress index based on the second heart rate variability; and to output a stress index of the subject based on the first stress index and the second stress index.

20 Claims, 9 Drawing Sheets

(51) Int. Cl.
*A61B 5/024* (2006.01)
*A61B 5/11* (2006.01)
*G06T 7/11* (2017.01)

(52) U.S. Cl.
CPC .......... *A61B 5/4809* (2013.01); *A61B 5/4818* (2013.01); *A61B 5/6892* (2013.01); *G06T 7/11* (2017.01)

(56) References Cited

U.S. PATENT DOCUMENTS

| | | | |
|---|---|---|---|
| 2015/0164238 A1* | 6/2015 | Benson | A61B 5/6892 340/540 |
| 2016/0165961 A1* | 6/2016 | Karp | A61M 21/02 2/69.5 |
| 2016/0206216 A1 | 7/2016 | Kirenko | |
| 2018/0206783 A1* | 7/2018 | Yoon | A61B 5/024 |
| 2019/0053761 A1* | 2/2019 | Young | A61B 5/1102 |
| 2020/0156648 A1 | 5/2020 | Zhang et al. | |
| 2020/0405148 A1* | 12/2020 | Tran | A61B 3/0008 |
| 2021/0201496 A1 | 7/2021 | De Haan et al. | |
| 2022/0071535 A1* | 3/2022 | Jernigan | A61B 5/0205 |

FOREIGN PATENT DOCUMENTS

| | | |
|---|---|---|
| JP | 2014507842 A | 3/2014 |
| JP | 2017516597 A | 6/2017 |
| JP | 2021146061 A | 9/2021 |
| KR | 10-1712002 B1 | 3/2017 |

OTHER PUBLICATIONS

Habiba Farrukh hfarrukh@purdue.edu et al., "FaceRevelio: A Face Liveness Detection System Single Front Camera", Sep. 21, 2020, pp. 1-13, XP058479959.

* cited by examiner

PPG SIGNAL FREQUENCY ANALYSIS

HEALTHCARE APPARATUS FOR CALCULATING STRESS INDEX

This application claims the benefit of Korean Patent Application No. 10-2021-0192189, filed on Dec. 30, 2021 and Korean Patent Application No. 10-2022-0046602, filed on Apr. 15, 2022, which is hereby incorporated by reference as if fully set forth herein.

BACKGROUND OF THE INVENTION

Field of the Invention

The present invention relates to a healthcare apparatus, and more particularly to an artificial intelligence (AI)-based digital healthcare apparatus capable of predicting the heart rate, the respiratory rate, the sleep state, the stress index, etc. of a subject in a contactless manner.

Discussion of the Related Art

Research to sense a biometric signal using a PPG sensor in a non-invasive manner to treat human diseases has been conducted. Due to the current COVID-19 pandemic, however, technology capable of remotely monitoring health in a non-invasive manner has become quite important. Many countries have recommended using remote health strategies if possible in order to reduce a danger of COVID-19 in a medical environment. For this reason, a new method other than a biometric information monitoring method through a conventional body contact type sensor is required.

Remote health monitoring technology is based on a communication system, such as a mobile phone or an online health portal. The remote health monitoring technology may be greatly required for continuous patient monitoring even after an epidemic, such as COVID-19, ends. This technology may be used to measure a physiological signal of a user based on a facial video stream using a camera. This technology may also be used for monitoring of biometric information of an infant, monitoring of health of an elder, or mental health monitoring as well as contagious diseases.

However, research to predict the heart rate, the stress score (or index), and the respiratory rate of a person by estimating a biometric signal of the person, as remote health monitoring technology, and a healthcare product based thereon have not yet been proposed.

PRIOR ART DOCUMENT

Korean Registered Patent Publication No. 10-1712002

SUMMARY OF THE INVENTION

It is an object of the present invention to provide a healthcare apparatus.

It is another object of the present invention to provide a monitoring method for healthcare using the healthcare apparatus.

It is a further object of the present invention to provide a computer-readable recording medium having a program for performing the monitoring method for healthcare in a computer recorded therein.

Objects of the present invention are not limited to the aforementioned objects, and other unmentioned objects will be clearly understood by those skilled in the art based on the following description.

In accordance with an aspect of the present invention, the above and other objects can be accomplished by the provision of a healthcare apparatus including a ballistocardiogram (BCG) sensor configured to sense a ballistocardiogram signal of a subject, a camera configured to photograph a face of the subject to acquire a color facial image, and a processor configured to detect a region of interest (ROI) corresponding to the face from the color facial image, to detect a first color image of a forehead area in the detected region of interest, to convert the detected first color image into a black and white image to acquire a first black and white image; to detect a second color image of a cheek area in the detected region of interest, to convert the detected second color image into a black and white image to acquire a second black and white image; to apply the acquired first black and white image and the acquired second black and white image to a predetermined trained algorithm model to output a remote photoplethysmography (rPPG) signal waveform of the subject; to calculate a first heart rate variability from the sensed BCG signal waveform, to calculate a first stress index based on the first heart rate variability; to calculate a second heart rate variability from the output remote PPG signal waveform, to calculate a second stress index based on the second heart rate variability; and to output a stress index of the subject based on the first stress index and the second stress index. The output stress index may correspond to the average of the first stress index and the second stress index. The predetermined trained algorithm model may use a Siamese neural network (SNN) of multi-task learning. The healthcare apparatus may further include a bed configured to allow the subject to lie down thereon, wherein the BCG sensor may be attached to an inner surface of a cover configured to cover the bed. The processor may apply the acquired first black and white image and the acquired second black and white image to the predetermined trained algorithm model to output a respiratory rate signal waveform of the subject, may calculate a respiratory rate based on the output respiratory rate signal waveform, and may determine whether the subject is in a sleep apnea state based on the calculated respiratory rate. The healthcare apparatus may further include a communication unit configured to transmit the calculated respiratory rate to a linked terminal.

The processor may detect two eye area images from the region of interest, may detect two pupil images from the detected two eye area images, and may determine that the subject is in a wake state when two irises are detected and recognized from the detected two pupil images. When both the two irises are not recognized from the detected two pupil images for a predetermined time, the processor may determine that the subject is in a sleep state.

The healthcare apparatus may further include a bed configured to allow an infant corresponding to the subject to lie down thereon, wherein, upon determining that the subject is in the wake state, the processor may perform control such that a bounce function that is being performed by the bed is maintained. The healthcare apparatus may further include a bed configured to allow the subject to lie down thereon, wherein, upon determining that the subject is in the sleep state, the processor may control vertical and horizontal movements of the bed such that the bounce function is slowly stopped.

The healthcare apparatus may further include a main frame, wherein the camera may be movable on the main frame to photograph the face of the subject in consideration of the supine position of the subject and the direction in which the subject lies down.

The healthcare apparatus may further include a communication unit configured to transmit the output stress index to the linked terminal. The healthcare apparatus may further include a display unit configured to display the output stress index.

In accordance with another aspect of the present invention, there is provided a healthcare apparatus including a ballistocardiogram (BCG) sensor configured to sense a ballistocardiogram signal of a subject, a camera configured to photograph a face of the subject to acquire an infrared (IR) image when a predetermined time is nighttime or when the level of ambient light is less than a predetermined level, and a processor configured to detect a region of interest (ROI) corresponding to the face from the infrared image, to acquire a first image of a forehead area in the detected region of interest, to acquire a second image of a cheek area in the detected region of interest, to apply the acquired first image and the acquired second image to a predetermined trained algorithm model to output a remote photoplethysmography (rPPG) signal waveform of the subject, to calculate a first heart rate variability from the sensed BCG signal waveform, to calculate a first stress index based on the first heart rate variability; to calculate a second heart rate variability from the output remote PPG signal waveform, and to calculate a second stress index based on the second heart rate variability; and to output a stress index of the subject based on the first stress index and the second stress index.

In accordance with another aspect of the present invention, there is provided a monitoring method for healthcare, the monitoring method including sensing a ballistocardiogram (BCG) signal of a subject, photographing a face of the subject to acquire a color facial image, detecting a region of interest (ROI) corresponding to the face from the color facial image, detecting a first color image of a forehead area in the detected region of interest and converting the detected first color image into a black and white image to acquire a first black and white image and detecting a second color image of a cheek area in the detected region of interest and converting the detected second color image into a black and white image to acquire a second black and white image, applying the acquired first black and white image and the acquired second black and white image to a predetermined trained algorithm model to output a remote photoplethysmography (rPPG) signal waveform of the subject, and calculating a first heart rate variability from the sensed BCG signal waveform, calculating a first stress index based on the first heart rate variability; calculating a second heart rate variability from the output remote PPG signal waveform, calculating a second stress index based on the second heart rate variability; and outputting a stress index of the subject based on the first stress index and the second stress index. The monitoring method may further include detecting two eye area images from the region of interest and detecting two pupil images from the detected two eye area images, and determining that the subject is in a wake state when two irises are detected and recognized from the detected two pupil images. The monitoring method may further include determining that the subject is in a sleep state when both the two irises are not recognized from the detected two pupil images for a predetermined time. The monitoring method may further include applying the acquired first black and white image and the acquired second black and white image to the predetermined trained multi-task learning algorithm model to output a respiratory rate signal waveform of the subject, calculating a respiratory rate based on the output respiratory rate signal waveform, and determining whether the subject is in a sleep apnea state based on the calculated respiratory rate. The monitoring method may further include transmitting the calculated respiratory rate to a linked terminal. The monitoring method may further include displaying the calculated respiratory rate through a display unit.

In accordance with a further aspect of the present invention, there is provided a monitoring method for healthcare, the monitoring method including sensing a ballistocardiogram (BCG) signal of a subject, photographing a face of the subject to acquire an infrared (IR) image when a predetermined time is nighttime or when the level of ambient light is less than a predetermined level, detecting a region of interest (ROI) corresponding to the face from the infrared image, acquiring a first image of a forehead area in the detected region of interest and acquiring a second image of a cheek area in the detected region of interest, applying the acquired first image and the acquired second image to a predetermined trained algorithm model to output a remote photoplethysmography (rPPG) signal waveform of the subject, and calculating a first heart rate variability from the sensed BCG signal waveform and calculating a first stress index based on the first heart rate variability; calculating a second heart rate variability from the output remote PPG signal waveform, calculating a second stress index based on the second heart rate variability; and outputting a stress index of the subject based on the first stress index and the second stress index.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
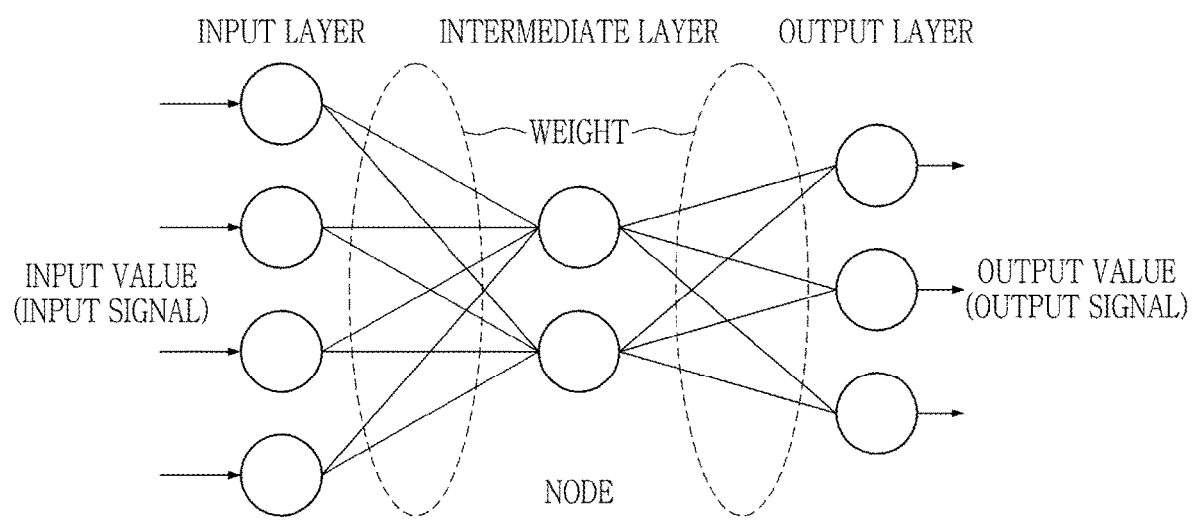
FIG. 1 is a view illustrating a layered structure of an artificial neural network.

Hereinafter, preferred embodiments of the present invention will be described in detail with reference to the accompanying drawings. The detailed description disclosed hereinafter together with the accompanying drawings shows exemplary embodiments of the present invention and does not reveal a unique embodiment by which the present invention can be implemented. The following detailed description includes specific details in order to provide complete understanding of the present invention. However, those skilled in the art will appreciate that the present invention can be implemented without such specific details.

In some cases, in order to avoid the concept of the present invention being ambiguous, a well-known structure and apparatus may be omitted, or each structure and apparatus will be shown in the form of a block diagram including core functions thereof. In addition, the same elements are denoted by the same reference numerals throughout this specification.

Before describing the present invention, artificial intelligence (AI), machine learning, and deep learning will be described. As a method of most easily understanding the relationship among the three concepts, three concentric circles may be imagined. Artificial intelligence may be the outermost circle, machine learning may be the middle circle, and deep learning, which leads a current artificial intelligence boom, may be the innermost circle.

Hereinafter, deep learning will be described in more detail.

Deep learning, which is a kind of artificial neural network (ANN) using a human neural network theory, is a machine learning model or an algorithm set referring to a deep neural network (DNN) configured to have a layered structure in which at least one hidden layer (hereinafter referred to as an "intermediate layer") is provided between an input layer and an output layer. Briefly, deep learning may be an artificial neural network having deep layers.

A deep neural network, which is a descendant of the artificial neural network, is the latest version of the artificial neural network that goes beyond the existing limits and has achieved successes in areas in which a large number of artificial intelligence technologies suffered failures in the past. When describing modeling an artificial neural network by imitating a biological neural network, biological neurons are modeled as nodes in terms of processing units, and synapses are modeled as weights in terms of connections, as shown in Table 1 below.

TABLE 1

| Biological neural network | Artificial neural network |
|---|---|
| Cell body | Node |
| Dendrite | Input |
| Axon | Output |
| Synapse | Weight |

FIG. 1 is a view illustrating a layered structure of an artificial neural network.

Like a plurality of biological neurons of a human being, not a single biological neuron, is connected to each other in order to perform a meaningful task, for an artificial neural network, individual neurons are also connected to each other via synapses, whereby a plurality of layers is connected to each other, wherein connection intensity between the respective layers may be updated using weights. The multilayered structure and connection intensity are utilized in a field for learning and recognition. The respective nodes are connected to each other via links having weights, and the entire model performs learning while repeatedly adjusting weights. The weights, which are basic means for long-term memory, express importance of the respective nodes. The artificial neural network initializes the weights and updates and adjusts weights using a data set to be trained in order to train the entire model. When a new input value is input after training is completed, an appropriate output value is inferred. The learning principle of the artificial neural network is a process in which intelligence is formed through generalization of experiences, and learning is performed in a bottom-up manner. When two or more (i.e. 5 to 10) intermediate layers are provided, as shown in FIG. 1, this means that the layers are deepened and is called a deep neural network, and a learning and inference model achieved through the deep neural network may be referred to as deep learning.

The artificial neural network may play a role to some extent even when the artificial neural network has one intermediate layer (generally referred to as a "hidden layer") excluding input and output. When problem complexity increases, however, the number of nodes or the number of layers must be increased. It is effective to increase the number of layers so as to provide a multilayered model; however, an available range is restrictive due to limitations in that efficient learning is impossible and the amount of calculation necessary to train the network is large.

Previous deep neural networks were generally designed as feedforward neural networks. In recent research, however, deep learning structures have been successfully applied to a recurrent neural network (RNN). As an example, there are cases in which the deep neural network structure was applied to the field of language modeling. A convolutional neural network (CNN) has been well applied to the field of computer vision, and successful application cases have been well documented. Furthermore, in recent years, the convolutional neural network has been applied to the field of acoustic modeling for automatic speech recognition (ASR), and it is evaluated that the convolutional neural network has been more successfully applied than existing models. The deep neural network may be trained using a standard error back-propagation algorithm. At this time, weights may be updated through stochastic gradient descent using the following equation.

The present invention proposes a healthcare apparatus capable of predicting information related to a living body (a heart rate, a sleep state, such as sleep apnea, a wake/sleep state, etc.) and a stress index of the living body based only on information of a facial image in a contactless state using a predetermined trained algorithm model. A health monitoring method of predicting PPG and a respiratory rate (RR) based on a facial image in a contactless manner may be a health monitoring method that is suitable for a subject who needs continuous health monitoring, such as an infant or an adult having a disease, such as glycosuria, and that is safe in an environment in which contagious COVID-19 is prevalent. The present invention proposes a method of predicting the heart rate, the stress index, whether the subject is in a sleep apnea state, or the wake/sleep state of a subject using a remote PPG (rPPG) signal and a ballistocardiogram (BCG) signal. Hereinafter, ballistocardiogram (BCG) and photoplethysmography (PPG), as biometric information to be used in the present invention, acquired by sensing a human body will be described briefly first.

Photoplethysmogram (PPG) Sensor

A photoplethysmography (PPG) sensor will be described as an example of a heart rate sensor. PPG sensor is short for photoplethysmography sensor. Photoplethysmography (PPG) is a pulse wave measurement method that measures the flow rate of blood in a blood vessel using optical characteristics of living tissue in order to check an activity state of the heart or the heart rate. The pulse wave, which is a pulsating waveform generated in the heart while undulating, is measurable through a change in blood flow rate generated according to relaxation and contraction of the heart, i.e. a change in volume of a blood vessel. In photoplethysmography, which is a method of measuring a pulse wave using light, a change in optical properties, such as reflection, absorption, and a transmission rate, of living tissue generated at the time of volume change is sensed and measured by an optical sensor, whereby it is possible to measure pulsation. This method is capable of performing non-invasive pulse measurement, is widely used due to merits thereof, such as miniaturization and convenience in use, and may be used as a biosignal sensor in a wearable device.

Ballistocardiogram (BCG) Sensor

Figure 2:
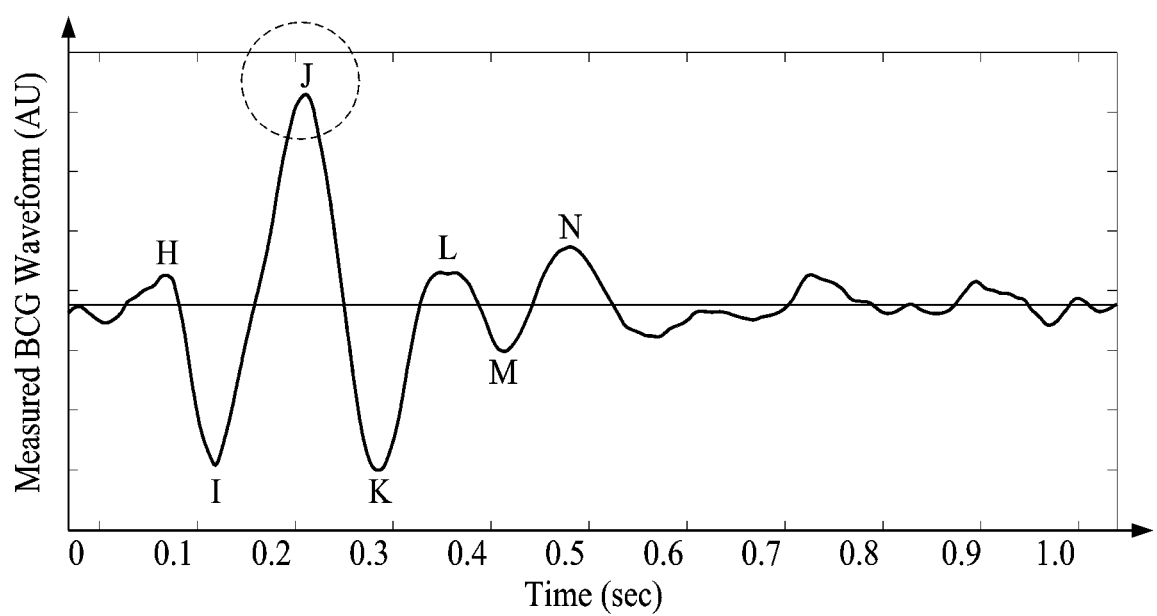
FIG. 2 is a view illustrating a ballistocardiogram (signal) waveform.

FIG. 2 is a view illustrating a ballistocardiogram (signal) waveform.

The moment blood discharged from a ventricle of the heart during a cardiac cycle passes through the aorta, the blood transmits reaction to our bodies. A signal measuring vibration (ballistic trajectory) due to a change in blood flow in the heart and the blood vessel related thereto is called ballistocardiogram (BCG). Ballistocardiogram means a signal measuring a ballistic trajectory due to a change in blood flow in the heart and the blood vessel according to contraction and relaxation of the heart, and is an index indicating the activity state of the heart, similarly to an electrocardiogram.

Ballistocardiogram is an index indicating the activity state of the heart, similarly to electrocardiogram, and it is known that ballistocardiogram includes information about cardiac output and information about reflux and abnormal blood flow due to damage to a myocardial function. Consequently, this biosignal has the potential to be clinically utilized, such as evaluation in function of the heart, diagnosis of heart disease (cardiomyopathy), checking of treatment effects, and observation of the degree of recovery. A ballistocardiogram signal may be measured using an acceleration sensor, a load cell sensor, a PVDF film sensor, or an EMFi sensor. Since it is not necessary to attach an electrode to the body when these sensors are used, it is possible to measure a signal in an unconstrained/unconscious state, and the sensors may be usefully utilized in health monitoring for a long time or during everyday life.

As shown in FIG. 2, in a ballistocardiogram signal, a heart rate pattern is expressed by peaks H, I, J, and K, and a part that is admitted as a real heat rate is peak J. In the ballistocardiogram signal, the heart rate pattern appears in various forms due to noise, environment, and personal influence. In general, peak I shows a noticeably big difference depending on environment, measurement conditions, and individual differences, and peaks H and J have nonuniform sizes. Also, when peak I is small, only one of peaks H and J may appear in a large form.

A remote measurement method will be described in brief.

Figure 3:
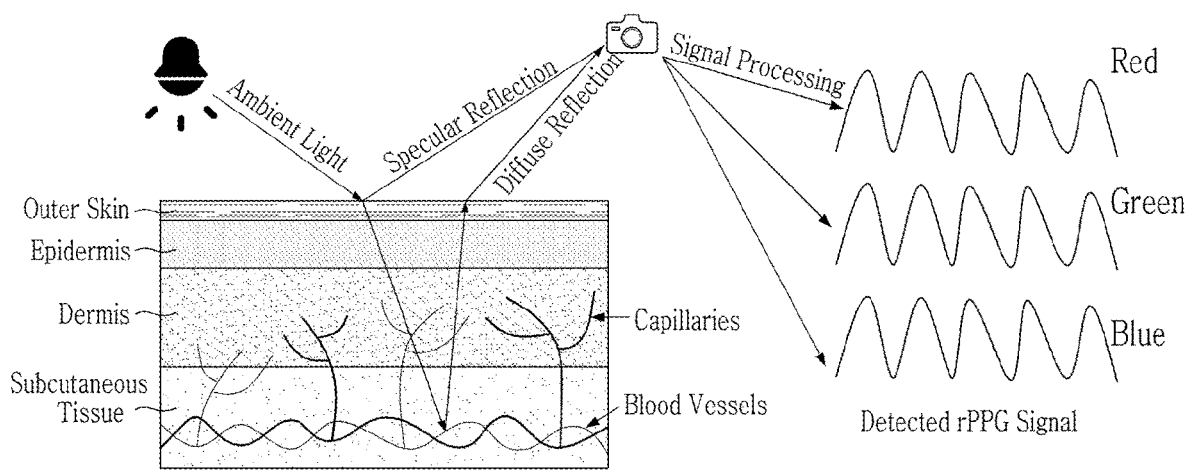
FIG. 3 is an illustrative view provided to explain remote PPG (rPPG)

FIG. 3 is an illustrative view provided to explain remote PPG (rPPG).

It is possible to remotely measure a heart rate and heart rate variability using remote PPG. As shown in FIG. 3, video recording may be performed using a high-resolution camera in order to remotely measure a heart rate, etc. This may be useful for various physical, health, and emotional monitoring on a driver, an elder, or an infant. The remote PPG is contactless measurement, although the remote PPG is identical in principle to PPG. As contrast between specular reflection and diffuse reflection, a change in red, green, and blue light reflection on the skin is measured. The specular reflection is pure light reflection from the skin. The diffuse reflection is reflection remaining due to changes in absorption and scattering by skin tissue depending on the amount of blood. This is the principle using the fact that hemoglobin reflects red light and absorbs green light. FIG. 3 illustrates red, green, and blue light waveforms detected after signal processing is performed using a remote PPG technique, and it can be seen that rPPG waveforms detected for these kinds of light are different from each other. Utilization of a remote measurement technique for remotely monitoring biometric information is very high in that it is possible to predict biometric information using only information of a face in a contactless manner in an environment in which infant monitoring or contactless monitoring, for example contagious disease monitoring, such as COVID-19 monitoring, is required. A facial image is acquired using ambient light around a subject as a light source.

Multi-Task Learning (MTL)

Many attempts to predict biometric information using a deep neural network and machine learning have been made. In implementing a mobile medical system, multi-task learning (MTL) is an important approach to perform various tasks using limited resources. A PPG signal and a respiratory rate signal are simultaneously extracted from a facial video stream using MTL. The present invention proposes a complex-value-based multi-task learning (MTL) algorithm model that simultaneously processes video streams. Two facial areas are constituted by complex number data that are simultaneously processed in a neural network architecture having complex values. Through this complex process, the PPG signal and the respiratory rate signal may be more efficiently and accurately extracted than an actual-value-based single-task learning algorithm.

Multi-task learning (MTL) is a model learning method of performing prediction by simultaneously learning various tasks, e.g. two or more tasks, through a shared layer. As relevant tasks are simultaneously learned, learned representation may be shared, and therefore tasks having good representation may be helpful in model learning. Useful information acquired through learning may have a good influence on other tasks, thereby contributing to becoming a better model. In addition, many tasks may be simultaneously predicted, whereby it is possible to achieve training to a generalized model more robust to overfitting, and two existing tasks are combined into one model, whereby it is possible to lighten the model, which is more advantageous in application to a mobile device, such as a smartphone.

Figure 4:
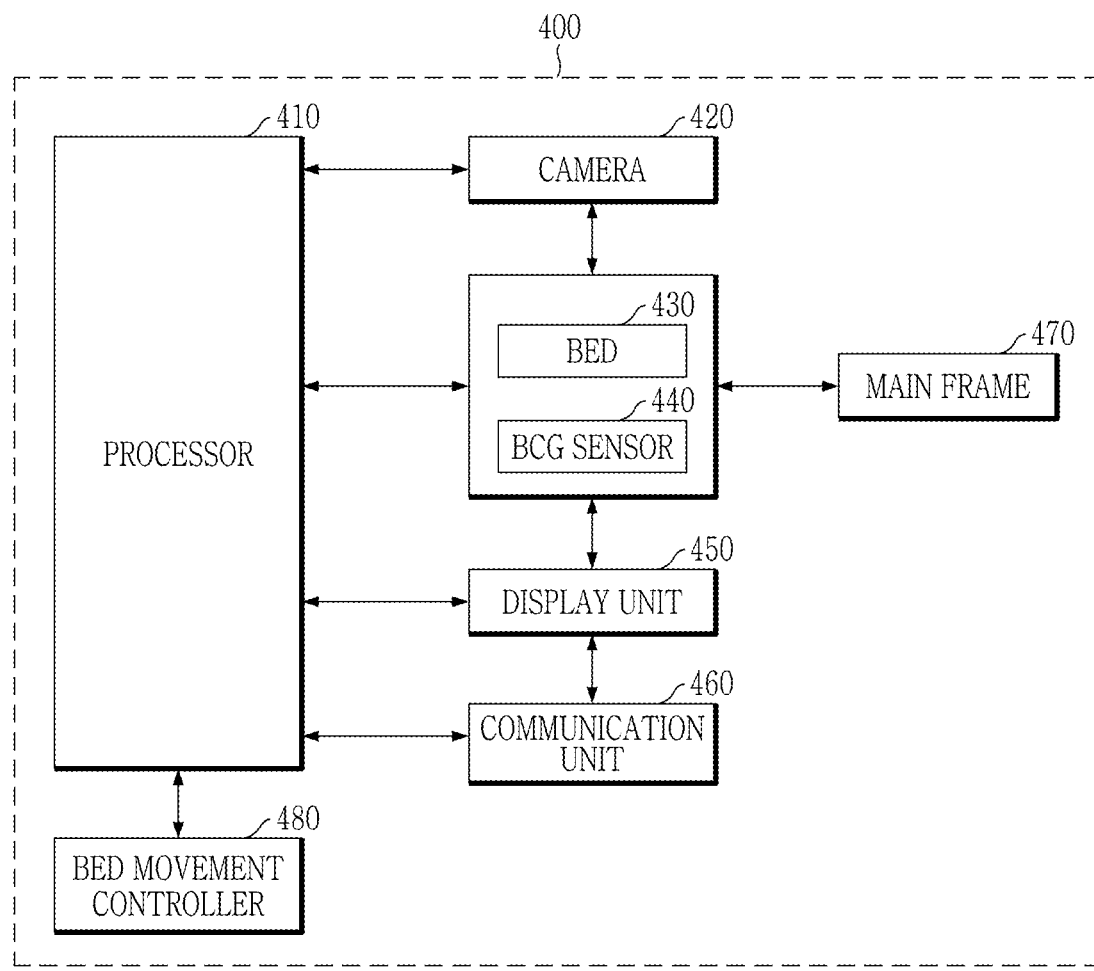
FIG. 4 is a block diagram provided to explain the construction of a healthcare apparatus according to an embodiment of the present invention.
Figure 5:
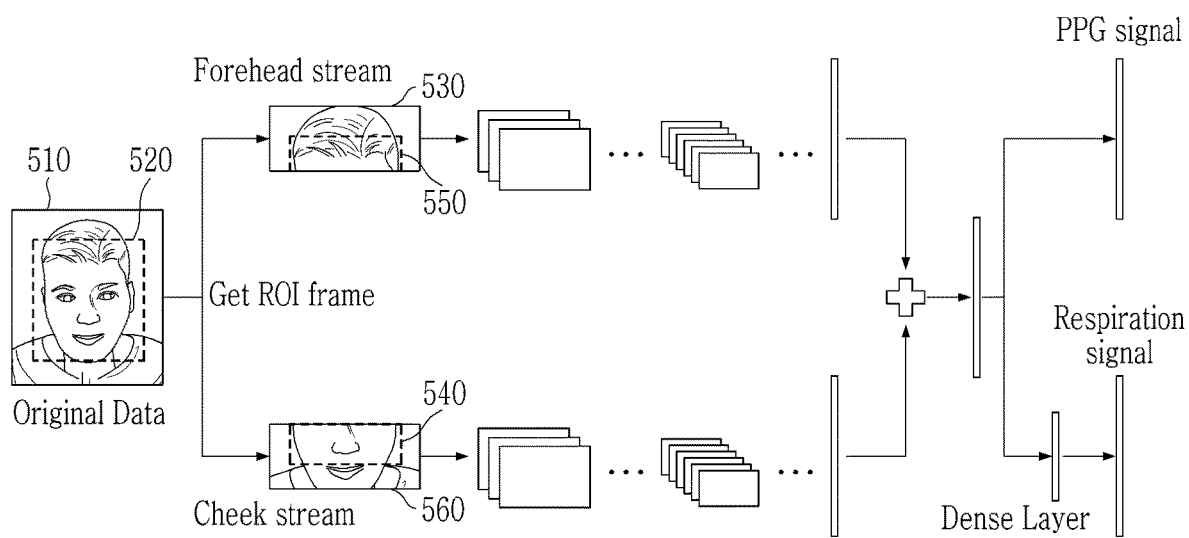
FIG. 5 is a view provided to explain output of a PPG signal and a respiratory rate (RR) signal from an MTL algorithm learning model using a remote PPG technique.

FIG. 4 is a block diagram provided to explain the construction of a healthcare apparatus 400 according to an embodiment of the present invention, and FIG. 5 is a view provided to explain output of a PPG signal and a respiratory rate (RR) signal from an MTL algorithm learning model using a remote PPG technique.

Referring to FIG. 4, the healthcare apparatus 400 according to the present invention may include a processor 410, a camera 420, a bed 430, a BCG sensor 440, a display unit 450, a communication unit 460, a main frame 470, and a bed motion controller 480.

The camera 420 captures an image of the face of a subject (e.g. an infant lying on the bed 430). The camera 420 may transmit the captured facial image of the subject to the processor 410 through the communication unit 460. The processing 410 may acquire the facial image of the subject. Here, the captured facial image of the subject may be a color image, such as an RGB image.

Referring to FIG. 5, the processor 410 may acquire original data 510 having the captured facial image of the subject, and may detect the facial image of the subject from the original data 510. The processor 410 may acquire region-of-interest frames 530 and 540 from the facial image of the subject, and may detect a forehead area 430 and a cheek area 560 from the region-of-interest frames 530 and 540, respectively. The processor 410 may learn the facial image using a convolutional neural network (CNN) or a Siamese neural network (SNN), which is a deep learning network used in image processing, to predict a PPG signal and a respiratory rate signal. In the present invention, it is preferable for the multi-task learning algorithm learning model to use the Siamese neural network (SNN). The processor 410 repeatedly applies a filter (kernel) to all areas of the forehead image and the cheek image extracted from the facial image 520 in order to find and learn a pattern. The reason that the forehead and the cheek are extracted is that the difference between two regions of the body due to the time difference in blood rising from the heart is utilized as meaningful information in order to train the model.

Each of the image of the detected forehead area and the image of the cheek area is a color image. Hereinafter, the image 550 of the forehead area will be referred to as a first color image, and the image 560 of the cheek area will be referred to as a second color image, for convenience of description. The processor 410 converts the first color image and the second color image into black and white images, and acquires a first black and white image from the first color image and a second black and white image from the second color image. After conversion into the black and white images, the processor 410 learns through the MTL (e.g. multi-task Siamese network) to predict a PPG signal and a respiratory rate signal.

As shown in FIG. 5, the processor 410 converts the first color image of the forehead area and the second color image of the cheek area into a first black and white image and a second black and white image, respectively, and inputs the converted images to a predetermined trained multi-task learning algorithm model using the Siamese neural network (SNN). The processor 410 applies the first black and white image and the second black and white image to the predetermined trained multi-task learning algorithm model to output a remote PPG signal waveform (which may be called a PPG signal waveform output using an rPPG technique) and a respiratory rate (RR) waveform. As described above, it is preferable for the processor 410 to convert the color images of the forehead area and the cheek area into black and white images, respectively, and to input the black and white images to the predetermined trained algorithm model when a predetermined time is daytime or when the level of the ambient light is a predetermined level or more. When the predetermined time is daytime or when the level of the ambient light is the predetermined level or more, the processor 410 may perform control such that the camera 420 photographs the face of the subject to acquire a color image.

When the predetermined time is nighttime or when the level of the ambient light is less than the predetermined level, on the other hand, the processor 410 may perform control such that the camera 420 or a separate camera configured to capture an infrared image photographs the face of the subject to acquire an infrared (IR) image. When the predetermined time is nighttime or when the level of the ambient light is less than the predetermined level, the camera 420 may photograph the face of the subject to acquire an infrared (IR) image, and the processor 410 may detect a region of interest (ROI) corresponding to the face from the infrared image, and may acquire a first image of the forehead area and a second image of the cheek area from the detected region of interest. In addition, the processor 410 may apply the first image and the second image acquired from the infrared image to the predetermined trained multi-task learning algorithm model in order to output a remote photoplethysmography (rPPG) signal waveform of the subject. Subsequently, the processor 410 may calculate a first heart rate from the sensed BCG signal waveform, may calculate a second heart rate from the output remote PPG signal waveform, and may output the heart rate of the subject based on the first heart rate and the second heart rate.

As described above, the processor 410 may select whether to acquire the face of the subject as a color image or an infrared image depending on the time zone or the ambient light. The processor 410 may convert the color image into a black and white image according to selection based on the time zone or the ambient light, and may input the black and white image to the predetermined trained algorithm (MTL algorithm) model so as to be applied thereto, or may input an image acquired from the infrared image to the predetermined trained algorithm model so as to be applied thereto.

The healthcare apparatus 400 according to the present invention may include the bed 430, on which the subject (e.g. an infant) may lie. The BCG sensor 440 may be attached to the inside of a cover of the bed 430. Since the BCG sensor 440 is provided at an inner surface of the cover of the bed 430, it is possible to sense a ballistocardiogram from the back or the flank of the subject when the subject lies on the bed.

The processor 410 may calculate a heart rate from the ballistocardiogram signal waveform acquired from the BCG sensor 440, may acquire a PPG signal waveform from the predetermined trained MTL algorithm model, and may calculate a heart rate from the acquired PPG signal waveform. Here, the heart rate calculated from the ballistocardiogram signal waveform is referred to as a first heart rate, and the heart rate calculated from the PPG signal waveform is referred to as a second heart rate. The first heart rate may be calculated as the number of peaks J in the BCG signal waveform per unit time (e.g. 1 minute), and the second heart rate may be calculated as the number of peaks in the rPPG signal waveform per unit time (e.g. 1 minute). The processor 410 may output the heart rate of the subject based on the first heart rate calculated from the ballistocardiogram signal waveform and the second heart rate calculated from the PPG signal waveform acquired using the remote PPG technique. As an example, the processor 410 may output the average of the first heart rate and the second heart rate.

In addition, the processor 410 may calculate heart rate variability (HRV) from the ballistocardiogram signal waveform. As an example, the heart rate variability may be calculated by Mathematical Expression 1 below. Here, heart rate variability calculated from the ballistocardiogram signal waveform is referred to as first heart rate variability.

$$BCG\,HRV = \frac{Jpeak(n+1) - Jpeak(n)}{SamplingRate} \quad \text{[Mathemcatical Expression 1]}$$

The processor 410 may calculate heart rate variability from the PPG signal waveform from the rPPG technique based on Mathematical Expression 2 below. Here, heart rate variability calculated from the PPG signal waveform is referred to as second heart rate variability.

$$rPPG\,HRV = \frac{peak(n+1) - peak(n)}{SamplingRate} \quad \text{[Mathematical Expression 2]}$$

Figure 6A:
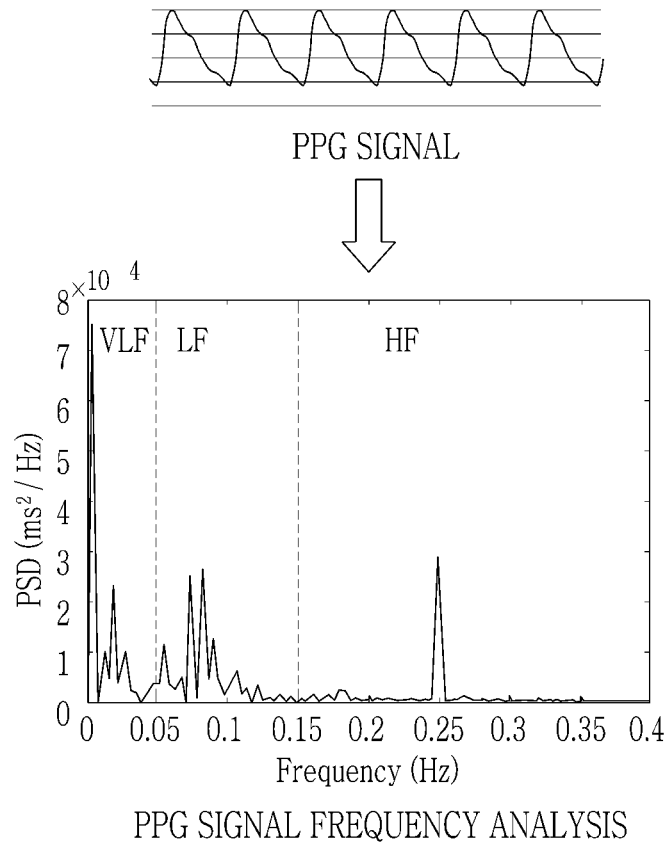
FIG. 6A and FIG. 6B are views illustrating PPG signal frequency analysis and LF score/HF score distribution for calculation of a stress index of a subject.
Figure 6B:
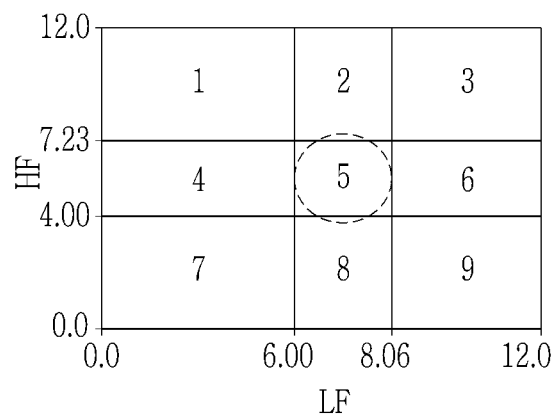

FIG. 6A and FIG. 6B are views illustrating PPG signal frequency analysis and LF score/HF score distribution for calculation of a stress index of the subject.

It is necessary for the processor 410 to perform PPG signal waveform frequency analysis and BCG signal waveform frequency analysis in order to calculate a stress index. As an example, PPG signal waveform frequency analysis is shown in FIG. 6A. The processor 410 may calculate a first stress index (score) of the subject based on the first heart rate variability, and may calculate a second stress index of the subject based on the second heart rate variability. Here, a method of calculating the first stress index and the second stress index is performed as represented by Mathematical Expression 3 below.

[Mathematical Expression 3]
$$LF = \ln \int_{0.04}^{0.15} (PSD \text{ of } HRV) df (\text{msec}^2)$$

$$LF = \ln \int_{0.15}^{0.4} (PSD \text{ of } HRV) df (\text{msec}^2)$$

$$LF \text{ score} = \begin{cases} \dfrac{LF}{6.00} & (0 \le LF \le 6.00) \\ 1 & (6.00 < LF \le 8.06) \\ 1 - 0.5 \dfrac{LF - 8.06}{12 - 8.06} & (8.06 < LF \le 12) \end{cases}$$

$$HF \text{ score} = \begin{cases} \dfrac{HF}{4.00} & (0 \le HF \le 4.00) \\ 1 & (4.00 < HF \le 7.23) \\ 1 - 0.5 \dfrac{HF - 7.23}{12 - 7.23} & (7.23 < HF \le 12) \end{cases}$$

$$\text{Stress measurement score} = 100 \times (\tfrac{2}{3} LF \text{ score} + \tfrac{1}{3} HF \text{ score})$$

In Mathematical Expression 3, a signal of a sympathetic nervous system LF and a signal of a parasympathetic nervous system HF are calculated and converted into a stress index.

A description will be given with reference to Mathematical Expression 3 above and FIG. 6A. LF (sympathetic nerve) is an integral value in a power spectral density graph of heart rate variability at a low frequency of 0.04 to 0.15 Hz. HF (parasympathetic nerve) is an integral value in a power spectral density graph of heart rate variability at a high frequency of 0.15 to 0.40 Hz. For a stress index (score), the natural logarithm is taken for LF power and HF power, and LF score and HF score are calculated depending on the range thereof, and conversion into a stress index is performed. The stress score is a score indicating the distance from a fifth area, which is normal.

The processor 410 may calculate the first stress index (score) of the subject based on Mathematical Expression 1 above and Mathematical Expression 3 above, and may calculate the second stress index of the subject based on Mathematical Expression 2 above and Mathematical Expression 3 above. The processor 410 may output the stress index of the subject based on the first stress index and the second stress index. As an example, the processor 410 may output the average of the first and second stress indices as the stress index of the subject.

The processor 410 also outputs a respiratory rate (RR) signal waveform based on the predetermined trained multitask learning algorithm model using the Siamese neural network (SNN), in addition to the PPG signal waveform. The processor 410 also performs a subject health monitoring function, such as a function of determining whether the subject (e.g. an infant) is in a sleep apnea state, based on the output respiratory rate signal waveform. The processor 410 may perform control such that the output respiratory rate signal waveform, the respiratory rate, etc. are displayed on the display unit 450 so as to be seen by a person who monitors the subject. In addition, the processor 410 may perform control such that the output heart rate, the output stress index, and the output (or calculated) respiratory rate are displayed on the display unit 450, whereby the health state of the subject is monitored from the outside.

The communication unit 460 may periodically or aperiodically transmit information, such as the output heart rate, the output stress index, and the output respiratory rate, to a user's terminal that performs health monitoring of the subject or a server through Wi-Fi, Bluetooth, etc. Aperiodic transmission is performed only when at least one of the output heart rate, the output stress index, and the output respiratory rate exceeds a predetermined critical value. As an example, only when a determination is made that the output respiratory rate indicates a sleep apnea state, the communication unit 460 may transmit the output respiratory rate to a linked terminal. The user may periodically or aperiodically receive health monitoring information of the subject through their linked terminal in order to check the health state of the subject.

Figure 7:
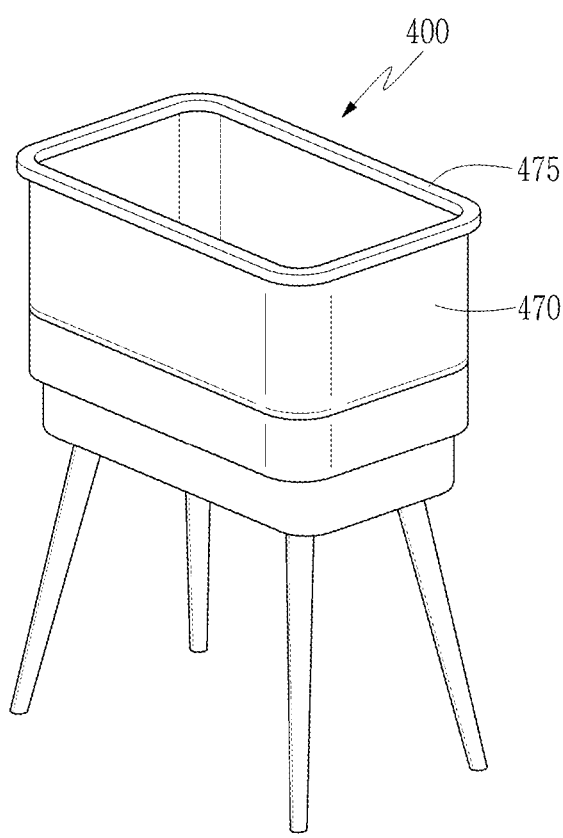
FIG. 7 is a view illustrating the healthcare apparatus according to the present invention.

FIG. 7 is a view illustrating the healthcare apparatus 400 according to the present invention.

Referring to FIG. 7, the main frame 470 of the healthcare apparatus 400 may include a lower support portion configured to support the bed 430 from below and a side support portion 475 disposed so as to surround the bed 430, the side support portion 475 serving as a guard configured to prevent the subject from falling from the bed 430. The camera 420 may be located at the side support portion 475 in order to photograph the face of the subject. A moving member configured to allow the camera 420 to be movable in order to track the face of the subject as the subject moves in a state of lying on the bed 430 may be provided at the side support portion 475. The camera 420 may photograph the face of the subject while moving from the side support portion 475 of the main frame 470 in consideration of the supine position of the subject and the direction in which the subject lies down.

Figure 8:
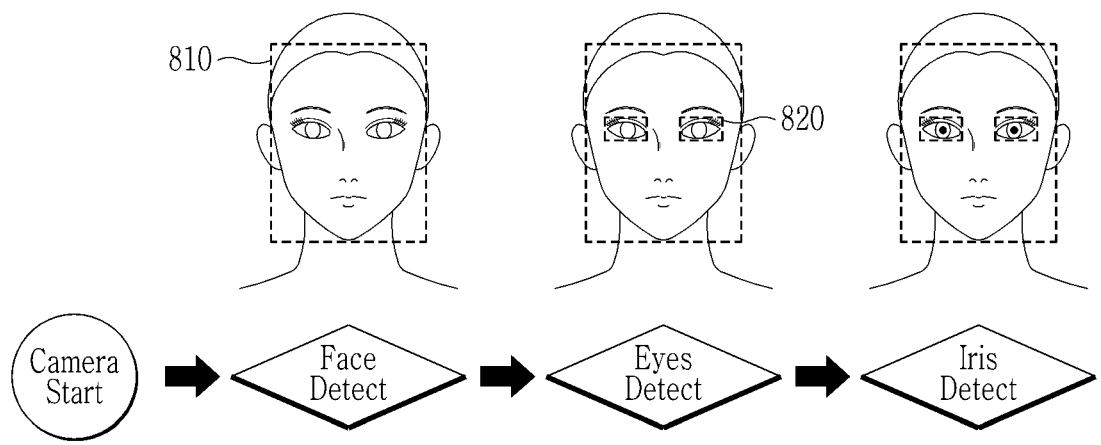
FIG. 8 is a view illustrating a step of detecting the iris of the subject in the healthcare apparatus according to the present invention.
Figure 9:
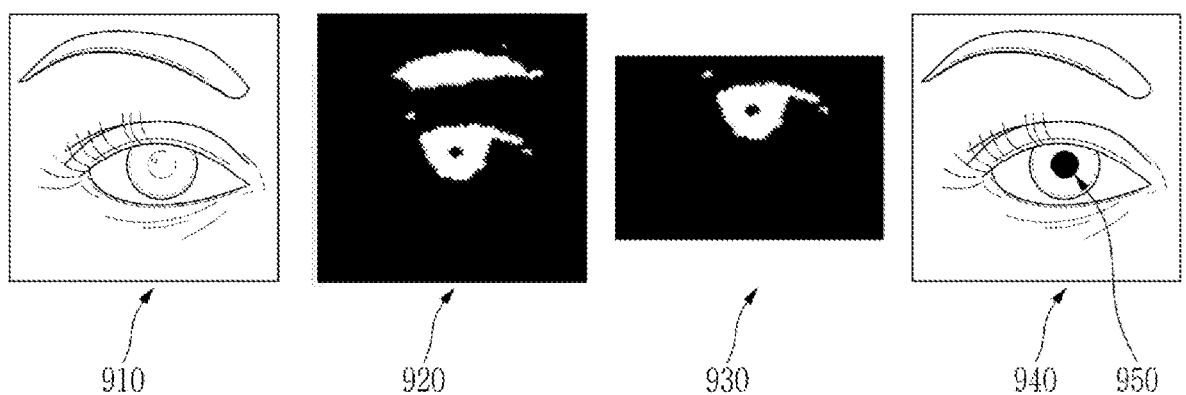
FIG. 9 is a view describing in detail a method of detecting the pupil (iris) of the subject in the healthcare apparatus according to the present invention.

FIG. 8 is a view illustrating a step of detecting the iris of the subject in the healthcare apparatus 400 according to the present invention, and FIG. 9 is a view describing in detail a method of detecting the pupil (iris) of the subject in the healthcare apparatus 400 according to the present invention.

Referring to FIG. 8, the camera 420 photographs the face of the subject. The processor 410 detects an image 810 of a facial area of the subject, which is a region of interest, and extracts images 820 of two eye areas of the subject from the detected facial image 810. The processor 410 detects two irises from the detected two eye area images 820. At this time, when the two irises are detected or recognized from the detected two eye area images 820, the processor 410 determines that the subject is in a wake state. When both the two irises are not recognized from the detected two eye area images 820 for a predetermined time, on the other hand, the processor 410 determines that the subject is in a sleep state.

Referring to FIG. 9, the processor 410 may detect an eye area from the facial image of the subject to acquire an eye area image 910. The processor 410 detects a pupil from the acquired eye area image 910 to acquire a pupil area image 920, and removes an eyebrow and noise from the eye area image 910 to acquire a pupil image 930. The processor 410 may detect an iris 950 based on the pupil image 930, and may display the detected iris 950 in an eye area image 940.

For the sake of description, only one eye is shown in FIG. 9; however, the camera 420 and the processor 410 perform image capturing and image processing on two eyes of the subject.

Upon determining that the subject (e.g. an infant) is in a wake state, the processor 410 may control the bed movement controller 480 such that a bounce function that is being performed by the bed 430 is maintained. The bed movement controller 480 is provided at a lower part of the bed 430 to control horizontal and vertical movements of an upper plate of the bed 430 under control of the processor 410, whereby the bounce function of the bed 430 is performed. Upon determining that the subject is in a sleep state, on the other hand, the processor 410 may control the bed movement controller 480 such that the horizontal and vertical movements of the upper plate of the bed 430 are controlled, whereby the bounce function is slowly stopped.

Conventionally, the position of eyes is detected using brightness around the eyes and the position of eyebrows, whereby there is a problem in that other areas of the face are incorrectly recognized as the eyes. In the present invention, however, the processor 410 does not find the position of the eyes of the subject but detects irises from the two eye area images 820, checks whether the irises are recognized, and determines whether the subject is in a wake state or a sleep state, and therefore accuracy in checking the wake/sleep state of the subject is greatly improved.

As is apparent from the above description, in a healthcare apparatus according to an embodiment of the present invention, it is possible to measure information about the heart rate, the respiratory rate, the stress index, and the sleep state (sleep apnea) of a subject in a contactless manner with considerably improved accuracy.

In the healthcare apparatus according to the embodiment of the present invention, irises of the subject are recognized, whereby it is possible to greatly improve accuracy in checking a wake/sleep state.

In the healthcare apparatus according to the embodiment of the present invention, a biometric signal is estimated by predicting PPG and the respiratory rate (RR) of an infant, an elder, or a patient based on a facial image, whereby it is possible to continuously perform health monitoring.

In the healthcare apparatus according to the embodiment of the present invention, a biometric signal is estimated based on an image in a contactless manner in a situation in which a contagious disease, such as COVID-19, is prevalent, whereby it is possible to monitor health of an infant or a patient.

It should be noted that the effects of the present invention are not limited to the effects mentioned above, and other unmentioned effects will be clearly understood by those skilled in the art from the above description of the present invention.

The embodiments described above are predetermined combinations of elements and features of the present invention. Each element or feature must be considered to be optional unless explicitly mentioned otherwise. Each element or feature may be implemented in a state of not being combined with another element or feature. In addition, some elements and/or features may be combined to constitute an embodiment of the present invention. The sequence of operations described in the embodiments of the present invention may be changed. Some elements or features in a certain embodiment may be included in another embodiment, or may be replaced with corresponding elements or features in another embodiment. It is obvious that claims having no explicit citation relationship may be combined to constitute an embodiment or may be included as a new claim by amendment after application.

In the present invention, the processor 410 may be implemented by hardware, firmware, software, or a combination thereof. When an embodiment of the present invention is implemented using hardware, application specific integrated circuits (ASICs), digital signal processors (DSPs), digital signal processing devices (DSPDs), programmable logic devices (PLDs), or field programmable gate arrays (FPGAs), which are configured to perform the present invention, may be provided in the processor 410. The present invention may be implemented as a computer-readable recording medium having a program for performing the monitoring method for healthcare according to the present invention in a computer recorded therein.

Those skilled in the art will appreciate that the present invention may be embodied in other specific forms than those set forth herein without departing from essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

What is claimed is:

1. A digital healthcare apparatus for calculating a stress index by measuring in a contactless manner, comprising:
   a ballistocardiogram (BCG) sensor configured to sense a BCG signal of a subject;
   a camera; and
   a processor operably coupled to the BCG sensor and the camera, and configured to determine whether to obtain a face of the subject as a color image or an infrared (IR) image based on it being a predetermined time or a level of ambient light being less than a predetermined level;
   wherein the camera is configured to obtain a facial image by photographing the face of the subject based on the determination of the processor; and
   wherein the processor is configured to execute, via a combination of hardware circuits and software modules, operations comprising:
   detecting a region of interest (ROI) corresponding to the face in the facial image,
   obtaining a first image for a first area and a second image for a second area in the detected ROI,
   outputting a remote photoplethysmography (rPPG) signal waveform of the subject and a respiratory rate signal waveform together as correlated results generated from a predetermined trained algorithm model by applying the first image and the second image to the predetermined trained algorithm model performing prediction by simultaneously learning two tasks,
   computing a first heart rate variability from the sensed BCG signal and determining a first stress index using a frequency-domain signal processing method for the first heart rate variability,
   computing a second heart rate variability from the output rPPG signal waveform and determining a second stress index using the frequency-domain signal processing method for the second heart rate variability, and
   calculating a stress index of the subject based on the first stress index and the second stress index.

2. The digital healthcare apparatus according to claim 1, wherein the calculated stress index corresponds to an average of the first stress index and the second stress index.

3. The digital healthcare apparatus according to claim 1, wherein the predetermined trained algorithm model uses a Siamese neural network (SNN) of multi-task learning.

4. The digital healthcare apparatus according to claim 1, wherein the processor is configured to execute operations comprising:
   detecting two eye area images from the region of interest and to detect two pupil images from the detected two eye area images, and
   determining that the subject is in a wake state when two irises are detected and recognized from the detected two pupil images.

5. The digital healthcare apparatus according to claim 4, wherein, when both the two irises are not recognized from the detected two pupil images for a predetermined time, the processor determines that the subject is in a sleep state.

6. The digital healthcare apparatus according to claim 4, further comprising:
   a bed configured to allow an infant corresponding to the subject to lie down thereon, wherein
   upon determining that the subject is in the wake state, the processor performs control such that a bounce function that is being performed by the bed is maintained.

7. The digital healthcare apparatus according to claim 5, further comprising:
   a bed configured to allow the subject to lie down thereon, wherein
   upon determining that the subject is in the sleep state, the processor controls vertical and horizontal movements of the bed such that a bounce function is stopped.

8. The digital healthcare apparatus according to claim 1, further comprising:
   a main frame,
   wherein the camera is movable on the main frame to photograph the face of the subject in consideration of a supine position of the subject and a direction in which the subject lies down.

9. The digital healthcare apparatus according to claim 1, further comprising a communication unit operably coupled to the processor and configured to transmit the output stress index to a linked terminal.

10. The digital healthcare apparatus according to claim 1, further comprising:
    a bed configured to allow the subject to lie down thereon, wherein the BCG sensor is attached to an inner surface of a cover configured to cover the bed.

11. The digital healthcare apparatus according to claim 1, wherein the first area is a forehead area and the second area is a cheek area.

12. A monitoring method for calculating a stress index by measuring in a contactless manner by a digital healthcare apparatus, the monitoring method comprising:
    sensing a ballistocardiogram (BCG) signal of a subject;
    determining whether to obtain a face of the subject as a color image or an infrared (IR) image based on it being a predetermined time or a level of ambient light being less than a predetermined level;
    obtaining a facial image by photographing the face of the subject based on the determination;
    detecting a region of interest (ROI) corresponding to the face in the facial image;
    obtaining a first image for a first area and a second image for a second area in the detected ROI;
    outputting a remote photoplethysmography (rPPG) signal waveform of the subject and a respiratory rate signal waveform by applying the first image and the second image to a predetermined trained algorithm model;
    computing a first heart rate variability from the sensed BCG signal;
    determining a first stress index using a frequency-domain signal processing method for the first heart rate variability;
    computing a second heart rate variability from the output rPPG signal waveform;
    determining a second stress index using the frequency-domain signal processing method for the second heart rate variability; and
    calculating a stress index of the subject based on the first stress index and the second stress index.

13. The monitoring method according to claim 12, wherein the calculated stress index corresponds to an average of the first stress index and the second stress index.

14. The monitoring method according to claim 12, wherein the predetermined trained algorithm model uses a Siamese neural network (SNN) of multi-task learning.

15. The monitoring method according to claim 12, further comprising:
    detecting two eye area images from the region of interest and to detect two pupil images from the detected two eye area images; and
    determining that the subject is in a wake state when two irises are detected and recognized from the detected two pupil images.

16. The monitoring method according to claim 15, wherein, when both the two irises are not recognized from the detected two pupil images for a predetermined time, the processor determines that the subject is in a sleep state.

17. The monitoring method according to claim 15, further comprising:
    controlling such that a bounce function that is being performed by the bed is maintained upon determining that the subject is in the wake state.

18. The monitoring method according to claim 16, further comprising:
    controlling vertical and horizontal movements of the bed such that a bounce function is stopped upon determining that the subject is in the sleep state.

19. The monitoring method according to claim 12, further comprising:
    moving the camera on a main frame to photograph the face of the subject in consideration of a supine position of the subject and a direction in which the subject lies down.

20. The monitoring method according to claim 12, wherein the first area is a forehead area and the second area is a cheek area.

* * * * *